United States Patent Office 3,224,185
Patented Dec. 21, 1965

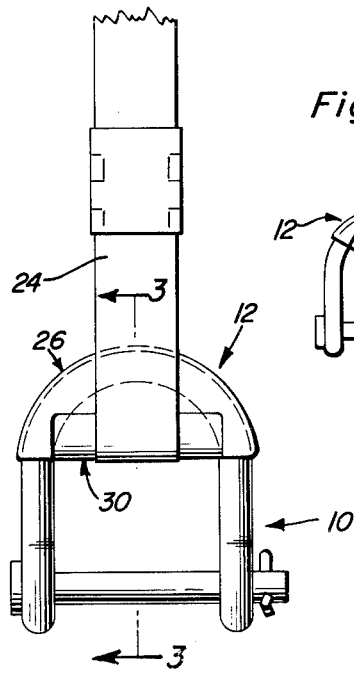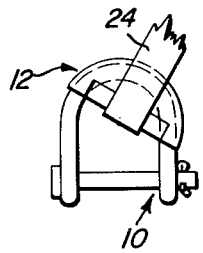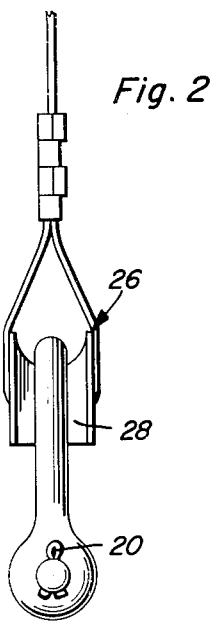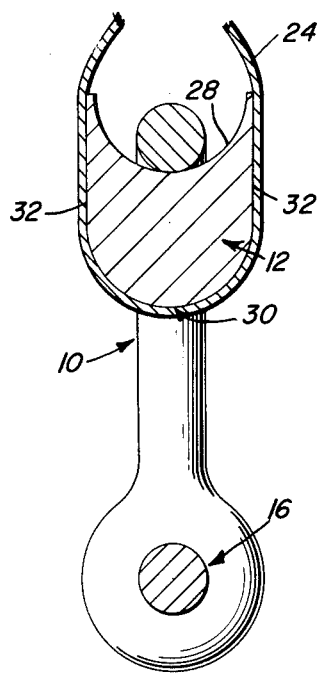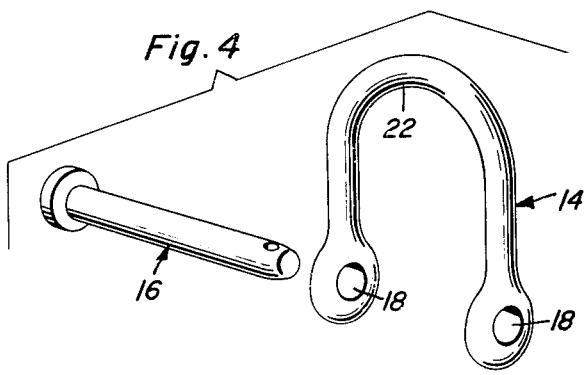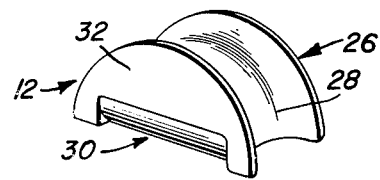
Daniel E. Grim
Floyd A. Kunz
Reinhart C. Gauerke   INVENTORS

3,224,185
LINK AND SHACKLE INSERT
Daniel E. Grim, 5520 Constitution Ave. NE.; Floyd A. Kunz, 6016 Bellamah NE.; and Reinhart C. Gauerke, 224 General Arnold NE., all of Albuquerque, N. Mex.
Filed Apr. 16, 1963, Ser. No. 273,381
8 Claims. (Cl. 59—86)

The present invention generally relates to securing rings, links or shackles, and is more particularly concerned with a novel insert for such rings, links and shackles.

As will be appreciated by those familiar with the art, shackles of various types are generally used to secure various cords or cables, such cords or cables, being circular in cross-section, usually conforming to the rounded bearing surface of the shackle. However, when using rounded shackles with conventional flat steel strapping or binding, a problem arises in that there is a tendency for the strapping to contact the shackle only with its outer edges, the intermediate portion of the width of that part of the strapping bending over the shackle being spaced therefrom because of the arcuate nature of the shackle. Because of this, there is a tendency for a tearing of the strapping to occur, it being appreciated that, in order to avoid this tendency of the strapping to tear at its edges, the load which might normally be sustained by the strapping must be substantially reduced.

Accordingly, it is a primary object of the present invention to provide a bearing insert which, upon insertion in a conventional shackle, ring or link, presents a straight elongated transversely convex bearing surface for engagement thereover by a conventional flat steel strapping in a manner so as to ensure a complete engagement of the entire width of the strapping, this insert having the opposite edge thereof arcuately shaped so as to conform to the shackle.

It is another object of the present invention to provide a shackle insert which enables a shift in the direction of the load while still maintaining the desired conforming bearing surfaces between both the flat strapping and the shackle itself.

Additionally, it is an object of the present invention to provide an insert which can be quickly inserted or removed as required.

Furthermore, it is an object of the present invention to provide an insert which, because of the specific shape thereof, will not accidentally disengage itself during use even though the angle or direction of the load be shifted.

Likewise, it is an object of the present invention to provide an insert which, though highly novel, is generally of simple construction and capable of economical manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a front elevational view illustrating the insert mounted on a shackle and having a flat strapping secured thereabout;

FIGURE 2 is a side elevational view of the unit of FIGURE 1;

FIGURE 3 is an enlarged cross-sectional view taken substantially on a plane passing along line 3—3 in FIGURE 1;

FIGURE 4 is an exploded perspective view of a shackle, including the pin therefor, and the insert; and FIGURE 5 is a reduced view illustrating the manner in which the direction of the load can be varied while still maintaining all of the advantages residing in the present invention.

Referring now more particularly to the drawings, it should first be noted that while a shackle 10 has been specifically illustrated in the drawings so as to describe the intended manner of using the insert of the present invention, the insert, generally referred to by reference numeral 12, is equally adaptable to various other types of support rings or links.

The shackle 10 is of a conventional type and includes a generally U-shaped portion 14 and a transversely extending pin 16 maintained through aligned apertures 18 in the free ends of the U-shaped portion 14 by means of a cotter pin 20. The shackle 10, as is the case with various other types of support links and rings, includes an arcuate portion 22 over which a cable or strapping is positioned. However, as was discussed supra, while a cable can, because of the round cross-section, generally conform to the arcuate portion 22, a flat metal strap means of the type illustrated in the drawings and referred to by reference numeral 24, because of its width, will only have the outer edges thereof in contact with the arcuate portion 22 of the shackle 10 thus resulting in a likely possibility of a tearing of the strapping 24 occurring at these points. In order to avoid this, the present invention contemplates the provision of the insert 12.

This insert 12 consists of a single solid generally semi-cylindrical body being of a thickness slightly greater than the thickness of the shackle with which it is to be used. This insert body is formed with a first edge 26 thereof being arcuate and generally conforming to the arcuate portion 22 of the shackle 10, this arcuate edge 26 having a transversely concave groove 28 therein, this groove extending the full length of the edge 26 and also conforming to the shape of the arcuate portion 22 while being of a slightly greater width so as to allow for relative movement between the shackle 10 and the insert 12. It will be appreciated that by so conforming the groove 28 to the arcuate portion 22 of the shackle, a substantial bearing area is produced even upon an angular adjustment or directional change of the loading illustrated in FIGURE 5.

The second edge 30 of the insert 12 is straight, elongated and transversely convexed to a degree sufficient so as to enable a smooth passage of the strapping 24 thereover with the full width of the strapping 24 being in bearing engagement with this edge 30 thus enabling the utilization of the maximum strength of the strapping 24.

It will also be noted that the opposite side faces 32 of the insert 12 are flat thus allowing for a smooth passage of the strapping 24 therealong. The straight edge 30, as will be seen in FIGURES 1 and 4, terminate at each end in the bottom of the groove 28 with the flat sides 32 extending to substantially the plane of this straight edge 30 thus providing, in effect, retaining flanges on both sides of the shackle along the full length of that portion of the shackle 10 which is in bearing engagement with the insert 12. As will be appreciated, upon the application of a tensile force on the flat strapping 24, the insert will tend to center itself relative to the shackle with the arcuate portion 22 of the shackle 10 positioning itself at the bottom of the groove 28 and with the sides of the groove, acting as retaining flanges, preventing any tendency for a lateral displacement of the insert 12 relative to the shackle 10.

From the foregoing detailed description, it should now be recognized that the insert of the present invention constitutes a significant advance both because of the novel structural details residing therein and because of the manner in which a vexing problem has been eliminated, this having been achieved by providing in effect two bearing surfaces, one conforming to the conventional arcuate shape of a shackle or ring and the other being elongated and transversely convex so as to conform to the normally used flat metal strappings or bindings throughout the entire width thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stress relieving shackle insert for flat metal strapping comprising a generally semi-cylindrical body having a convex edge including a longitudinally extending groove therein, and a substantially diametrically extending straight strap receiving edge, said diametrically extending edge being transversely convex throughout a major portion of its length.

2. The structure of claim 1 wherein the insert has opposite faces, said opposite faces being planar and parallel to each other.

3. The structure of claim 1 wherein said groove is of an equal depth and an equal width throughout its length.

4. A stress relieving means for flat metal strapping consisting of a bearing block having an elongated straight edge of a length at least equal to the width of the metal strapping, said edge being transversely convex so as to allow for a smooth forming of the strap thereover, and an arcuate convex edge terminating at its opposite ends at the opposite ends of the straight edge, said arcuate edge having a longitudinally extending groove therein, said groove being of an equal depth and width throughout its length.

5. The structure of claim 4 wherein said block has opposite faces, said opposite faces being planar and parallel to each other.

6. In combination, an arcuate link and a stress relieving insert for flat metal strapping positioned therein, said insert having a first portion thereof arcuately formed so as to conform to the arcuate link, said arcuate portion being orientated in bearing engagement with a corresponding portion of the link, means for retaining said insert in said link, and a second portion of the insert presenting a straight transversely convex elongated strap receiving bearing surface extending transversely between opposed portions of the link.

7. The structure of claim 6 wherein said insert is self-centering on said link relative to the direction of pull on the strap.

8. The structure of claim 6 wherein the insert has opposite faces, said opposite faces being planar and parallel to each other.

References Cited by the Examiner
UNITED STATES PATENTS

| | | | |
|---|---|---|---|
| 48,844 | 7/1865 | Shogren | 59—93 |
| 1,368,296 | 2/1921 | Sked | 24—123.7 |
| 1,517,346 | 12/1924 | Crandall | 59—86 |
| 2,436,247 | 2/1948 | Bufflap | 294—74 |
| 2,707,846 | 5/1955 | Beseler | 294—74 |
| 3,065,987 | 11/1962 | Elsner | 294—74 |

CHARLES W. LANHAM, *Primary Examiner.*

WILLIAM J. STEPHENSON, *Examiner.*